United States Patent [19]
Eden

[11] Patent Number: 5,826,889
[45] Date of Patent: Oct. 27, 1998

[54] RECREATIONAL VEHICLE ELECTRICALLY OPERATED LEVELER AND STABILIZERS

[75] Inventor: Edward J. Eden, Jackson, Mich.

[73] Assignee: Barker Manufacturing Co., Inc., Battle Creek, Mich.

[21] Appl. No.: 938,037

[22] Filed: Dec. 5, 1996

Related U.S. Application Data

[60] Provisional application No. 60/008,400, Dec. 8, 1995.

[51] Int. Cl.$^6$ ........................................................ B06S 9/00
[52] U.S. Cl. .......................... 280/6.153; 254/424; 180/41
[58] Field of Search ........................... 280/6.153, DIG. 1; 254/424; 180/41

[56] References Cited

U.S. PATENT DOCUMENTS

| | | |
|---|---|---|
| 4,067,543 | 1/1978 | Orth et al. . |
| 4,103,869 | 8/1978 | Mesny et al. . |
| 4,635,904 | 1/1987 | Whittingham .......................... 254/425 |
| 4,746,133 | 5/1988 | Hanser et al. ........................ 280/6.153 |
| 4,969,631 | 11/1990 | Whittingham . |
| 5,067,739 | 11/1991 | Kuan .................................... 280/6.153 |

*Primary Examiner*—Christopher P. Ellis
*Attorney, Agent, or Firm*—Duncan F. Beaman

[57] ABSTRACT

The invention pertains to electrically operated levelers and stabilizers for vehicles, particularly recreational vehicles, wherein a reversible electric motor extends and retracts telescoping members mounted to the vehicle by a linkage system. Operation of the linkage system through a linkage and slot arrangement automatically pivots the stabilizer to a horizontal storage position and lowers the stabilizer to an operative position during extension of the telescoping members. The links are locked by an over-center relationship when the stabilizer is extended, and automatically unlock from the over-center relationship when the stabilizer members are retracted and raised. A foot at the outer end of the stabilizer automatically pivots between storage and operative positions.

7 Claims, 2 Drawing Sheets

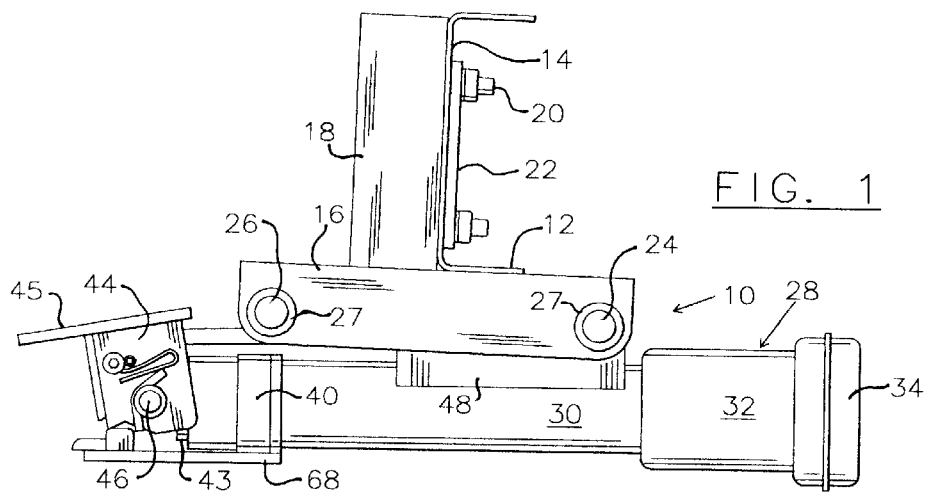
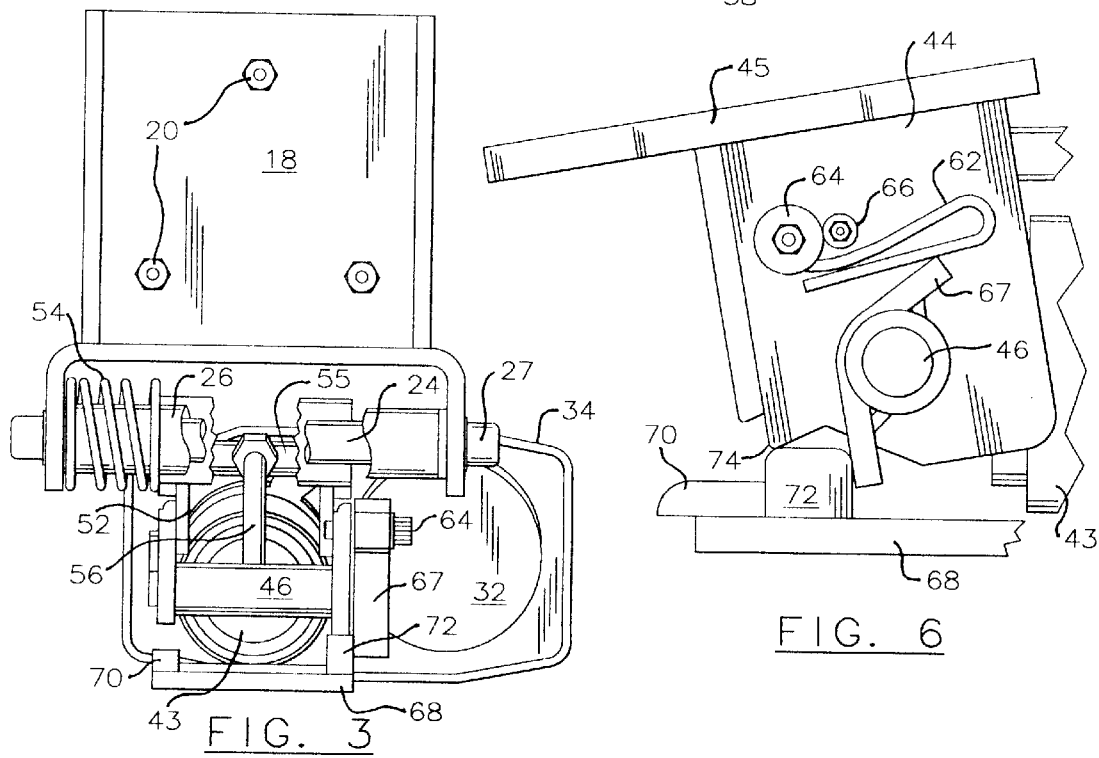

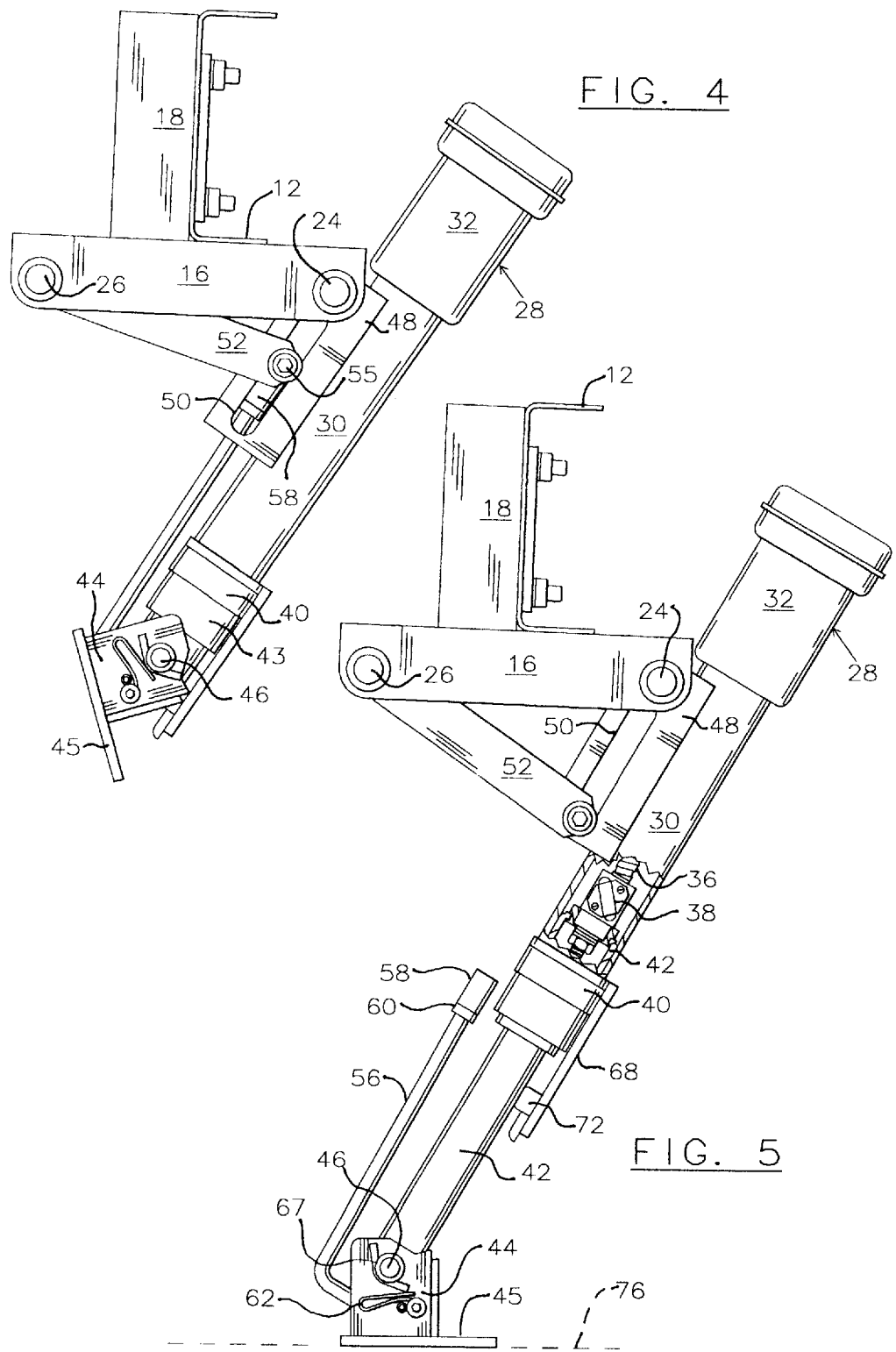

RECREATIONAL VEHICLE ELECTRICALLY OPERATED LEVELER AND STABILIZERS

This application claims the benefit of U.S. Provisional Application Ser. No. 60/008,400, filed Dec. 8, 1995.

FIELD OF THE INVENTION

The invention pertains to electrically operated levelers and stabilizers for vehicles, particularly recreational vehicles.

DESCRIPTION OF THE RELATED ART

Recreational vehicles preferably are stabilized by jacks once the vehicle is parked for use. A number of recreational vehicle stabilizers are available either manually or electrically operated, and such devices are shown in U.S. Pat. Nos. 4,067,543; 4,103,869 and 4,969,631, and similar patents.

While such devices effectively stabilize the vehicle, they are expensive to manufacture and install, require considerable clearance under the vehicle frame, and cannot be readily retrofitted to existing vehicles.

SUMMARY OF THE INVENTION

The invention pertains to a recreational vehicle leveler and stabilizer which is electrically operated, economical in construction, dependable in operation, easy to use, and which may be easily retrofitted to existing vehicles without extensive vehicle modification.

Economies of manufacture are achieved by the invention in that it uses a power unit very similar to an electrically powered recreational vehicle tongue jack presently manufactured by the assignee as shown in U.S. Pat. No. 3,592,443. Further, the leveler and stabilizer of the invention is manufactured of commercially available structural members such as channels, angle iron, rod and plate material. By welding such standard structural members together by arc welding, the mounting structure for the leveler and stabilizer is easily fabricated in such a manner that the unit may be readily mounted to a vehicle frame channel, and those components of the invention other than the assignee's power unit are easily fabricated by arc welding and simple drilling and punching operations.

The power unit is suspended below the mounting bracket by a pivot wherein the longitudinally extendable power unit may be pivoted between a horizontal stored position and an angularly disposed operative position. Linkages pivotally mounted on the bracket angularly pivot the power unit during extension and retraction, and in the operative position of the leveler and stabilizer the linkages are in an "over-center" relationship wherein the weight imposed upon the stabilizer locks it in position regardless of the magnitude of the vertical force imposed thereon.

The extendable and retractable piston of the power unit supports a pivotal ground engaging foot and is of such configuration as to automatically align with a supporting surface, and pivots to a stored position to improve ground clearance during vehicle operation.

The piston includes a linkage abutment which engages the linkage during piston retraction to unlock the linkage from its over-center position, and a torsion spring imposing a biasing force upon the linkage pivots the stabilizer during piston extension to its operative position. The operation of the leveler and stabilizer is automatic, and the operator needs merely to indicate whether the stabilizer is to move up or down and energization of the electric motor in the proper direction permits the desired movement of the power unit and the associated linkages.

BRIEF DESCRIPTION OF THE DRAWINGS

An understanding of the invention will be appreciated from the following description and accompanying drawings wherein:

FIG. 1 is an elevational view of the leveler and stabilizer of the invention shown in the stored position, FIG. 2 is an enlarged elevational cutaway view of the power unit mounting bracket and linkages with the unit in the stored position, FIG. 3 is an end elevational view as taken from the left of FIG. 1, partially broken away, and the foot pad being eliminated for purposes of illustration, FIG. 4 is a side elevational view of the invention as shown in a partially extended or retracted condition, FIG. 5 is a side elevational view of the invention shown in the operative leveling and stabilizing position with the piston extended, and FIG. 6 is a side elevational enlarged detail view of the stabilizer and leveler foot structure.

DESCRIPTION OF THE PREFERRED EMBODIMENT

With reference to the drawings, the entire leveler and stabilizer unit of the invention is indicated by reference numeral 10 which mounts upon the underside of a vehicle, such as a motor home or trailer. Such vehicle normally includes a frame formed of channel beams 12 upon which the unit 10 is mounted. The channel beam 12 includes a planar base 14 which defines the mounting surface for the unit 10.

The mounting bracket for the unit 10 includes a horizontally disposed channel 16 and a vertically related channel 18 welded to the base of the channel 16 as to extend upwardly for attachment to the channel 12 by bolts 20 extending through a backing plate 22.

A pivot pin 24 extends through the legs of the channel 16 and at the opposite end of the channel 16, a second pivot pin 26 extends therethrough. The pins 24 and 26 are maintained in position by Tinnerman nuts 27.

The power unit generally indicated at 28 is substantially identical to the electrically powered jack shown in the assignee's U.S. Pat. No. 3,592,443. The power unit includes a cylindrical tube 30, and an electrical two-way DC motor 32 driving gearing located within the transmission 34 which powers a rotatable shaft 36 within tube 30 having a nut 38 defined thereon. To reduce friction, the nut 38 is a ball nut using ball bearings and the threads defined on the shaft 36 are complementarily configured.

The outer end of the tube 30 includes an annular collar 40 attached thereto, and the tubular piston 42 is telescopically received within the tube 30 and its inner end is affixed to the nut 38 as will be appreciated in FIG. 5.

An end cap 43 is attached to the outer end of the piston 42 and the foot structure 44 is attached to the end cap 43. This foot structure includes spaced parallel plates attached to a foot pad 45, and a pivot pin 46 mounted on the end cap 43 extends through the foot end plates wherein the foot 44 will be pivotally mounted upon the end of the piston 42.

A bracket 48 is mounted upon the power unit tube 30 consisting of a pair of spaced plate members each having an elongated linear slot 50 defined therein. A pair of links 52 pivoted at their upper end to the pivot pin 26 are interconnected at their outer end by a slide pin 55 which extends through the slots 50. A torsion spring 54 wound about the pivot 26 imposes a clockwise biasing force upon the links 52 as viewed in the drawing. In this manner, the links 52 are biased in a direction tending to lower the slide pin 55 which tends to lower the left end of the power unit 28 and pivot the power unit in a counterclockwise direction toward the operative position shown in FIG. 5.

An abutment rod 56 is attached to the piston end cap 43 and extends in a parallel manner to the piston 42 as best shown in FIG. 5. The upper end of the rod 56 includes an abutment head 58 threaded thereon for adjustment along the length of the rod 56 and the adjustment of the head 58 is fixed by use of the lock nut 60.

The foot 44 pivots between operative and inoperative positions on the piston end cap 43 and such positioning of the foot is controlled by the leaf spring 62 which is bent in a U configuration as will be best appreciated from FIG. 6. One end of the spring 62 is mounted upon a foot plate by the spring anchor bolt 64, and rotation of the spring is prevented by engagement with the spring stop 66 mounted in a foot plate 44 consisting of a roll pin.

The free end of the spring 62 engages a shaped spring plate 67 affixed to the foot pivot 46, and it is to be understood that the foot pivot 46 is non-rotatably affixed to the piston end cap 43. Accordingly, as the foot 44 rotates about pivot 46, the spring plate 67 will not change its relationship to pivot 46.

A foot operator 68 is attached to the collar 40 mounted upon the tube 30. The foot operator 68 consists of a plate, FIG. 3, extending under the piston 42 and includes an extension 70, and an ear 72. As later described, the foot plate 44 closest to the observer in FIG. 6 includes an apex 74 which is engaged by the ear 72 when the power unit is retracted.

To use the leveler and stabilizer of the invention, the unit 10 is attached to the vehicle channel beam 12 by drilling properly spaced holes in the channel beam to receive the bolts 20. The power unit will be so located on the channel 12 that the lower leg of the channel 12 will usually engage the base of the bracket channel 16 as shown in the drawings.

In its non-use storage position as shown in FIGS. 1–3, the power unit 10 will be pivoted to its maximum clockwise direction as to assume a substantially horizontal position as shown in FIG. 1. The slide pin 55 is adjacent the right end of slots 50 which pivots the power unit 10 in a clockwise direction and the unit 10 is therefore raised its maximum extent to provide maximum ground clearance during vehicle operation. In this respect, the foot 44 will be pivoted its maximum clockwise direction on the pivot 46 as shown in FIGS. 1 and 6 due to the engagement of the ear 72 with the apex 74, and this engagement will produce maximum compression of the spring 62 due to engagement with the spring plate 67 as apparent from FIG. 6. With the foot 52 so raised, the foot does not detract from the vehicle ground clearance, and the raised foot also minimizes the entire length of the power unit and foot assembly as shown in FIG. 1.

When it is desired to level and stabilize the vehicle, the motor 32 will be energized in a direction causing the nut 38 to move along the threaded shaft 36 and extend the piston 42. FIG. 4 illustrates a partial extension of the piston 42, and as such extension of the piston disengages the ear 72 from the foot apex 74, the spring 62 will engage the spring plate 67 at a different position and the foot 44 begins to pivot on its pivot pin 46. Further extension of the piston 42 occurs, and when the lowermost end of the foot pad 45 engages the ground or support surface 76, as represented in FIG. 5, the foot pad 45 will pivot on pivot pin 46 so that the pad firmly engages the supporting surface. The motor 32 will continue to be energized raising the vehicle until leveling of the vehicle is achieved as indicated by such leveling indicators as may exist within the vehicle, as commonly known.

It will be appreciated that prior to the foot pad 45 engaging the supporting surface 76, the spring 54 will have been biasing the links 52 in a clockwise direction, FIGS. 4 and 5, moving the link slide pin 55 downwardly within the slots 50. It is this action which tilts the power unit 28 as shown in FIG. 4, and the slide pin 55 will engage the lower end of the slots 50 prior to the foot pad 45 engaging a supporting surface 76. When the slide pin 55 is engaging the lowermost end of the slots 50, the links 52 are in an over-center relationship with respect to the rotational movement of pin 55 about pivot 24 and vertical forces imposed on the power unit when the leveler and stabilizer is in the operative position. Accordingly, further pivoting of the power unit 28 ceases due to engagement of the sliding pin 55 with the lower end of the slots 50 and further extension of piston 42 causes the foot pad 45 to engage the supporting surface 76 and lift the vehicle for leveling purposes. Usually, several leveler and stabilizer units 10 will be used with a vehicle, for instance, two on each side, or one unit on each side and one at the vehicle front or end, and operation of the motor 32 will permit the unit 10 to achieve its desired purpose under control of the operator.

When it is desired to restore the unit 10 to its travel or storage position, the motor 32 is energized in the opposite direction to retract the piston 42 into the tube 30. As such retraction occurs, the foot pad 45 is lifted from supporting surface 76 and the spring 62 will pivot the foot 44 in a clockwise direction, FIG. 4. During the initial stages of piston retraction, the links 52 will continue to engage the lowermost end of the slots 50 as shown in FIG. 5. However, as the piston 42 is retracted, the abutment rod head 58 will engage the slide pin 55 and move the slide pin upwardly within the slots 50 releasing the slide pin 55 from its over-center relationship. As the piston 42 continues to be retracted, the abutment rod 56 continues to translate the sliding pin 55 within the slots 50 of bracket 48, causing the motor unit to pivot in a clockwise direction to the horizontal position shown in FIG. 1. When the piston 42 is fully retracted, the abutment head 58 will be in engagement with the slide pin 55 which will be disposed adjacent the upper end of the slots 50, and as the pin 55 is located to the left of pivot pin 22, FIG. 2, the pivot pin 55 will maintain the power unit 28 in its stored position and prevent counterclockwise rotation of the power unit until the piston 42 is again extended.

During the final stages of retraction of piston 42, the extension 70 defined on the foot operator 68 will engage one of the plates of foot 44 and cause clockwise rotation of the foot. Further piston retraction causes the ear 72 to engage its associated foot plate at apex 74 which produces the final clockwise positioning of the foot 44 as illustrated in FIG. 6, and the foot 44 is thereby positively retained in its fully retracted maximum road clearance position.

The construction of the unit 10 as described eliminates "rattles", and the presence of the unit 10 as attached to the vehicle does not adversely affect vehicle performance and creates no undesirable noises during travelling. As discussed above, the fact that the unit 10 may be constructed largely from low cost, readily available structural members, and utilizes the features of the previously available electrically powered power unit, a leveler and stabilizer of the invention can be economically priced, readily installed, and retrofitted to existing vehicles.

It is appreciated that various modifications to the inventive concepts may be apparent to those skilled in the art without departing from the spirit and scope of the invention.

I claim:

1. A vehicle leveler and stabilizer comprising, in combination, a mounting bracket adapted to be attached to a vehicle, first and second spaced pivots mounted on said bracket, an elongated reversible extender unit mounted on said first pivot pivotal between storage and operative positions, a third pivot mounted on said extender unit movable toward and away from said first pivot between first and second positions, a rigid link interconnecting said second and third pivots whereby movement of said third pivot to said second position pivots said unit to said operative position and movement of said third pivot to said first position pivots said unit to said storage position, said third pivot being in an over-center relationship to said first and second pivots when in said second position to lock said unit in said operative position, said extender unit having an extendable and retractable element having an outer end, a foot defined on said outer end, and third pivot release means selectively releasing said third pivot from its over-center relationship to said first and second pivots.

2. In a vehicle leveler and stabilizer as in claim 2, said extender unit comprising a reversible electric motor mounted upon a housing, a threaded shaft within said housing drivingly connected to said housing motor, and said extendable and retractable element comprising a tubular piston slidably guided within said housing operatively connected to an associated nut.

3. In a vehicle leveler and stabilizer as in claim 1, said mounting bracket including spaced legs, said first and second pivots comprising shafts extending between said bracket sides, a pair of spaced parallel plates mounted on said extender unit, aligned slots defined in said plates extending in the direction of the length of said extender unit, said third pivot comprising a shaft located in said slots movable throughout the length thereof.

4. In a vehicle leveler and stabilizer as in claim 1, said foot being pivotally mounted on said extender element outer end pivotal between raised and lowered positions, foot operating means defined on said element outer end engaging and pivoting said foot from said lowered position to said raised position upon said extendable element being retracted.

5. In a vehicle leveler and stabilizer as in claim 4, a spring biasing said foot toward said lowered position, said spring pivoting said foot to said lowered position upon said foot disengaging from said foot operating means.

6. In a vehicle leveler and stabilizer as in claim 1, said third pivot release means comprising an abutment mounted on said extender unit outer end engageable with said third pivot during retraction of said unit element displacing said third pivot from its over-center position.

7. In a vehicle leveler and stabilizer as in claim 3, said third pivot release means comprising an abutment mounted upon said extender unit outer end engageable with said third pivot during retraction of said unit element displacing said third pivot from its over-center position, upon full retraction of said element said abutment maintaining said third pivot in said first position to maintain said extender unit in said storage position.

* * * * *